J. V. D. ELDREDGE.

SEWING MACHINE SHUTTLE.

No. 10,231. Reissued Nov. 7, 1882.

Witnesses

H. C. Corlies,

Jno. C. MacGregor.

Inventor

John V. D. Eldredge

By Coburn & Thacher

Attorneys

N. PETERS, Photo-Lithographer, Washington, D. C.

UNITED STATES PATENT OFFICE.

JOHN V. D. ELDREDGE, OF DETROIT, MICHIGAN.

SEWING-MACHINE SHUTTLE.

SPECIFICATION forming part of Reissued Letters Patent No. 10,231, dated November 7, 1882.

Original No. 232,248, dated September 14, 1880. Application for reissue filed September 13, 1882.

*To all whom it may concern:*

Be it known that I, JOHN V. D. ELDREDGE, of Detroit, in the county of Wayne and State of Michigan, have invented certain new and useful Improvements in Sewing-Machine Shuttles, which are fully set forth in the accompanying specification, reference being had to the accompanying drawings, in which—

Figure 1:
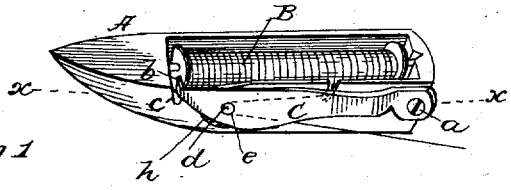
Figure 2:
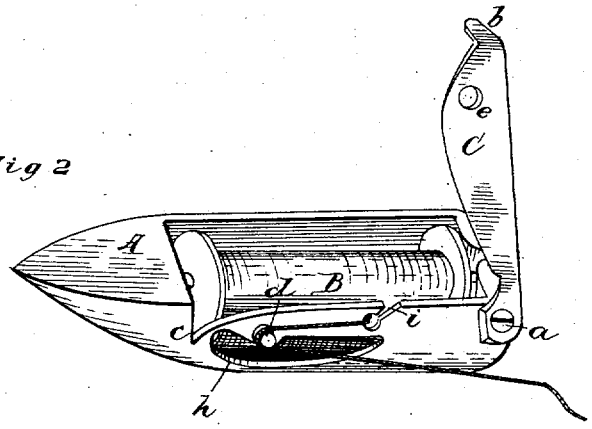
Figure 3:
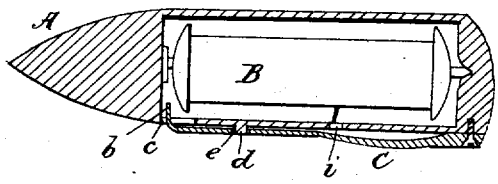

Figure 1 represents a perspective view of a shuttle embodying my invention with the tension-spring closed; Fig. 2, a similar view of the same on an enlarged scale and with the tension-spring opened; and Fig. 3, a longitudinal section of the same, taken on the line *x x*, Fig. 1.

My invention relates to certain improvements in the construction of shuttles for sewing-machines, whereby tension is provided for the thread coming from the bobbin, and the shuttle can be threaded without opening or disturbing the tension-spring, and the catching of the thread upon the shuttle is obviated.

I will proceed to describe the construction and operation of a shuttle in which I have embodied my invention in practical form, and will then point out definitely in the claim the special improvements for which I desire to obtain the protection of Letters Patent.

In the accompanying drawings, A represents a shuttle-case, which carries a bobbin, B, both of which are of ordinary construction, except as hereinafter described.

A spring-plate, C, is pivoted, by means of the screw *a*, to the heel of the shuttle upon the side which lies uppermost when the shuttle is placed in the shuttle-race. The free end of this spring C is bent inwardly, forming a lip, *b*, which, when the spring is in its closed position, rests within the wall of the shuttle, which is cut away, as at *c*, for that purpose, the spring being retained in its proper position by means of the post *d*, which projects outwardly from the wall of the shuttle and enters a hole, *e*, in the spring, as is clearly shown in the drawings. Beneath the spring C, I cut away the wall of the shuttle-case, forming an irregular elongated slot or opening, *h*, which is partially closed by the spring, and in the edge of the shuttle is formed an ordinary thread-slot, *i*, which is open, as shown in Fig. 2 of the drawings.

In practice the bobbin wound with thread is placed within the shuttle in the ordinary manner. The thread is then passed through the slot *i* in the shuttle-wall, thence to and under the lip *b* of the spring, and is drawn upon until it comes in contact with the post *d*, the thread lying between the spring C and the wall of the shuttle. As the shuttle moves forward in the race to make the stitch the thread is drawn back beneath the spring and around the post *d*. The side of the shuttle, being cut away, as shown, presents no surface upon which the thread can possibly catch, the thread lying over and along the opening *h* in the shuttle-case after it has passed the post *d*, until it reaches the edge of the spring C, and thereby having no surface in the case to catch upon between the post and the edge of the spring, while the formation of the lower edge of the spring prevents its catching at that point.

As greater or less tension is desired, the screw *a* is turned so as to cause the spring to press to a greater or less degree upon the thread, and this tension may be regulated without removing the shuttle from the machine, while it can readily be seen that the shuttle can be and is threaded without opening or disturbing the tension-spring, which latter is only touched for the purpose of regulating the tension.

The side of the shuttle presents no surface upon which the thread can rest to prevent its being carried back under the spring as it passes through the loop at *h*.

Having thus described my invention, what I claim as new, and desire to secure by Letters Patent, is—

1. In a shuttle for sewing-machines, a case provided with an open thread-slot in one side and a recess near the forward end, in combination with a tension-spring having its forward end bent and adapted to enter loosely the recess in the case, and a post or projection extending across the space between the tension-spring and case into an opening adapted to receive it, whereby the spring is retained in position when fastened to the case, and the shuttle may be threaded by passing the thread around the forward end of the spring and drawing it back around the post without disturbing the spring, substantially as described.

2. In a shuttle for sewing-machines, a case provided with an open thread-slot in one side, in combination with a removable tension-spring secured to the case at its heel end by a detachable fastening, and at its front end constructed and secured in the case to permit the thread to be passed around it, whereby the shuttle may be threaded without disturbing the spring, substantially as described.

3. In a shuttle for sewing-machines, a case provided with an open thread-slot in one side and a recess near the forward end, in combination with a tension-spring provided with a bend at its forward end, adapted to enter loosely the recess in the case, a tension-screw securing the heel end of the spring to the case, and adapted to regulate the tension, and a post or projection crossing the space between the spring and case, and adapted to retain the spring in position, substantially as and for the purpose set forth.

4. A shuttle-case, A, for sewing-machines, provided with an open thread-slot, *i*, in combination with the post *d*, projecting outwardly from the wall of the case, and the tension-spring C, provided with a bent lip, *b*, at its forward end, adapted to enter the recess *c* in the case, and an opening, *e*, adapted to receive the end of the post *d* when the spring is secured to the case, substantially as and for the purpose set forth.

5. The shuttle-case A for sewing-machines, provided with the open thread-slot *i* and the recess *c*, in combination with the tension-spring C, provided with the bent lip *b* and opening *e*, the post *d*, and the tension-screw *a*, substantially as and for the purposes set forth.

6. The tension-spring C, pivotally secured to the shuttle-case, as set forth, in combination with the shuttle-case provided with an elongated opening, *h*, cut in the wall thereof, said opening lying under the path of the bobbin-thread as it passes from between the tension-plate and the shuttle-case, and thence under the outer edge of the tension-plate, substantially as described, and for the purpose set forth.

7. A shuttle-case for sewing-machines, provided with an elongated opening, *h*, in combination with the post *d*, projecting outwardly from the wall of the case, and the tension-spring C, pivotally secured to the heel of the case and partially closing said opening, substantially as described, and for the purpose set forth.

JOHN V. D. ELDREDGE.

Witnesses:
GEO. W. MOORE,
V. K. MOORE.